US008013246B2

(12) United States Patent
Zheng

(10) Patent No.: US 8,013,246 B2
(45) Date of Patent: Sep. 6, 2011

(54) PUSH-IN EMERGENCY STOP COVER WITH PLUG-IN UNIT

(75) Inventor: Chun Kai Zheng, Yueqing (CN)

(73) Assignee: Zhejiang Kedu Electric Meg. Co. Ltd, Zhejiang (CN)

( * ) Notice: Subject to any disclaimer, the term of this patent is extended or adjusted under 35 U.S.C. 154(b) by 469 days.

(21) Appl. No.: 12/274,317

(22) Filed: Nov. 19, 2008

(65) Prior Publication Data

US 2009/0126430 A1 May 21, 2009

Related U.S. Application Data

(60) Provisional application No. 60/989,168, filed on Nov. 20, 2007.

(51) Int. Cl.
*H02G 3/14* (2006.01)

(52) U.S. Cl. ................ 174/66; 174/67; 174/50; 70/455; 312/328; 361/170

(58) Field of Classification Search .................... 174/66, 174/67; 70/455; 200/51 LM, 334, 538; 361/170; 318/445; 362/276; 368/10; 312/328
See application file for complete search history.

(56) References Cited

U.S. PATENT DOCUMENTS

| | | | | |
|---|---|---|---|---|
| 4,915,638 | A | 4/1990 | Domian | |
| 4,970,349 | A | 11/1990 | Jones | |
| 4,979,634 | A | 12/1990 | Begley | |
| 5,040,995 | A * | 8/1991 | Graninger et al. | 439/76.1 |
| 5,243,135 | A | 9/1993 | Shotey | |
| 5,280,135 | A | 1/1994 | Berlin et al. | |
| 5,389,740 | A | 2/1995 | Austin | |
| 6,198,046 | B1 | 3/2001 | Moodie | |
| 6,444,906 | B1 | 9/2002 | Lewis | |
| 6,457,843 | B1 | 10/2002 | Kester et al. | |
| 6,519,208 | B2 | 2/2003 | DeVries | |
| 6,649,838 | B1 | 11/2003 | Lopez, Sr. et al. | |
| 6,730,845 | B1 | 5/2004 | Criniti et al. | |
| 6,737,576 | B1 | 5/2004 | Dinh | |
| 7,553,040 | B2 * | 6/2009 | Boothe et al. | 362/101 |
| 7,732,709 | B2 * | 6/2010 | Puri et al. | 174/50 |
| 7,820,910 | B1 * | 10/2010 | Cleghorn et al. | 174/66 |

* cited by examiner

*Primary Examiner* — Dhiru R Patel
(74) *Attorney, Agent, or Firm* — Brian D. Smith P.C.

(57) ABSTRACT

A push-in emergency stop cover with a plug-in unit includes a retainer, a stop button, a lock cover, a lock base, a combination of a lock and lock spring assembled in the lock cover, a plug-in unit, a slide block, a push button and an associated spring, a slide block and associated spring, a groove provided in said lock cover, said plug-in unit having a key extending through an opening provided in said stop button and to one side of said slide block, the push button having a push rod provided with an inclined plane and a raised block having an inclined plane at the rear of the lock. When the plug-in unit is inserted in the stop button to separate the lock from a lock-stitch of the lock base, the lock cover will open; the lock cover will not open when the plug-in unit is removed after the cover is locked. The stop button has a retainer to cover an opening in the stop button to prevent foreign obstacles from falling into the opening.

12 Claims, 4 Drawing Sheets

PUSH-IN EMERGENCY STOP COVER WITH PLUG-IN UNIT

FIELD OF THE INVENTION

The present invention relates to a push-in emergency stop cover and, in particular, to a push-in emergency stop cover with a plug-in unit.

BACKGROUND OF THE INVENTION

An emergency stop cover with plug-in unit includes a lock cover and lock, a lock base having a lockstitch, a stop button, a locking tongue in front end of the lock inserted into a lockstitch for connecting the lock cover to the lock base when the emergency stop cover is in its locked position. Because plug-in units are not available for existing emergency stop covers, users of stop covers need another locking means to ensure that the emergency stop button will not open when the stop button is depressed.

In addition, many existing emergency stop buttons have a locking tongue in the front end of a shutter that projects out through the stop button. The stop cover opens by directly pushing the shutter at the time when it is not locked with a lock. As such, existing emergency stop covers are not convenient and safe to use.

BRIEF DESCRIPTION OF THE INVENTION

To overcome existing shortcomings, the present invention provides a practical and novel emergency stop cover which utilizes a single key (a push-in unit) which prevents the cover from opening when the key is removed after the emergency stop cover is depressed. The stop cover will only open when the key is inserted through an opening in the stop cover. In addition, the lock base has a lock opening for receiving a simple padlock without removal of the key and plug-in unit.

For the purpose of a preferred embodiment of the invention, this practical, distinctive and novel approach includes a retainer cover, an emergency stop button, a lock cover, a lock base, a lock piece, and a lock spring assembled in the lock cover together with the plug-in unit, slide blocks, a push button and associated springs; the slide blocks and springs are located in a groove of the lock cover. A shank portion or key of the plug-in unit extends through a hole provided in the stop button and into slide blocks to move them backwards. The push button has an integral push rod and the lock has a raised block portion with an inclined plane at the rear of lock.

The slide blocks are moved backwards by the shank or key of the plug-in unit when it is inserted in the stop button and the button is depressed manually. The push rod is pushed inwardly and passes between the slide blocks. The key of the plug-in unit has an inclined plane that propels the raised block at the rear of lock piece to cause the lock piece to move backwards. This action separates a locking tongue from a lockstitch of the lock base so that the lock cover opens. When the key is removed after the emergency stop cover is secured, the slide blocks return to their previous position under pressure of return springs. The locking tongue is prevented from moving backwards which if permitted would open the lock cover. As such, the lock cover is now secured to the lock base.

This practical and novel approach may use a one-piece or two-piece slide block. The user does not need another lock for this practical and novel approach. It has the advantage of operating conveniently, providing safety and reliability. The retainer cover can be rotated manually or machine operable, to cover the opening in the stop button that receives the key to prevent foreign objects from falling into the opening when the key is removed.

BRIEF DESCRIPTION OF THE DRAWINGS

The invention will be more readily understood by reference to the accompanying drawings wherein like reference numerals indicate like elements, and wherein reference numerals sharing the same last two digits identify similar corresponding elements throughout the various disclosed embodiments, and in which.

DETAILED DESCRIPTION OF THE PREFERRED EMBODIMENT

Figure 1:
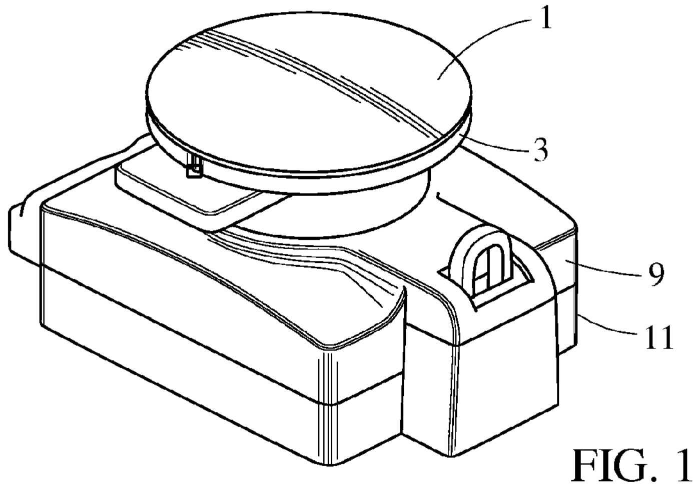
FIG. 1 is a perspective view of the emergency stop cover of the invention with a retainer cover in place over a stop button and plug-in unit.
Figure 2:
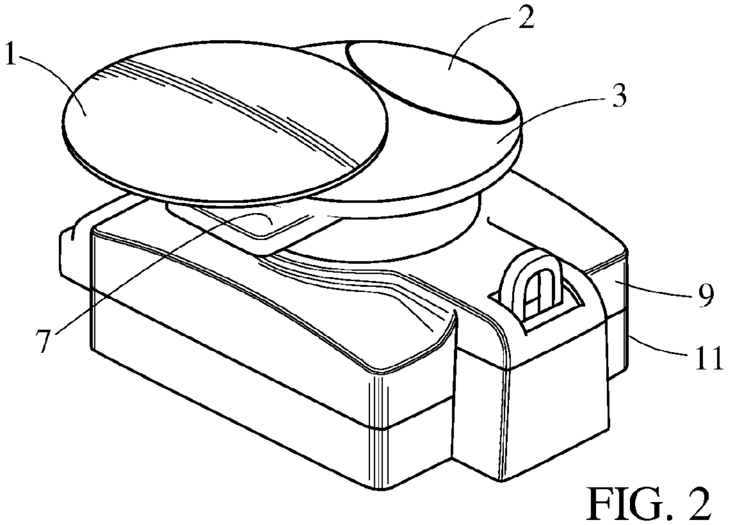
FIG. 2 is a perspective view of the invention showing the retainer cover rotated away from the plug-in unit.
Figure 3:
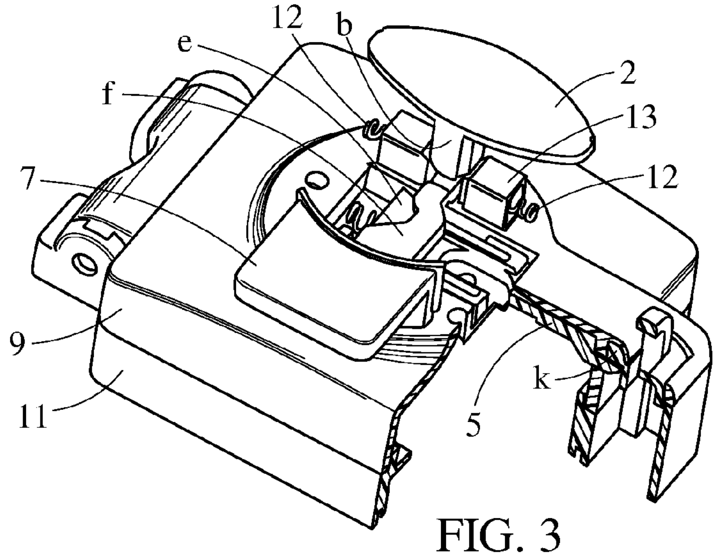
FIG. 3 is a perspective view of the invention with the retainer cover and stop button removed and a portion of the stop cover and lock base broken away to show inner workings of the invention.

FIGS. 1 through 3 illustrate the push-in emergency stop cover of the present invention which as shown has a retainer cover 1, a plug-in unit 2, an emergency stop button 3, a lock cover 9, a lock base 11, a lock piece 5 (FIG. 3) and a lockstitch k (FIG. 3) located in front end of lock base 11.

Figure 4:
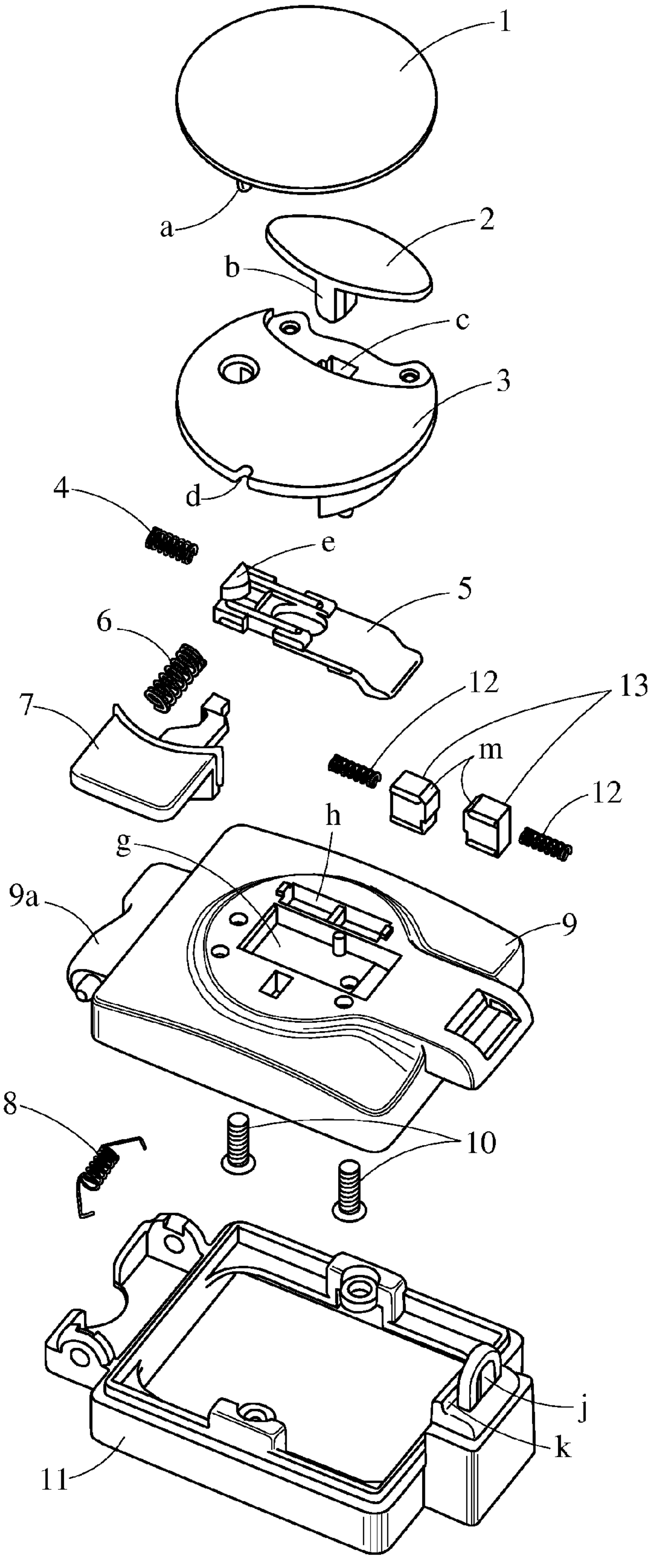
FIG. 4 is an exploded view of the components of FIGS. 1 to 3.
Figure 6:
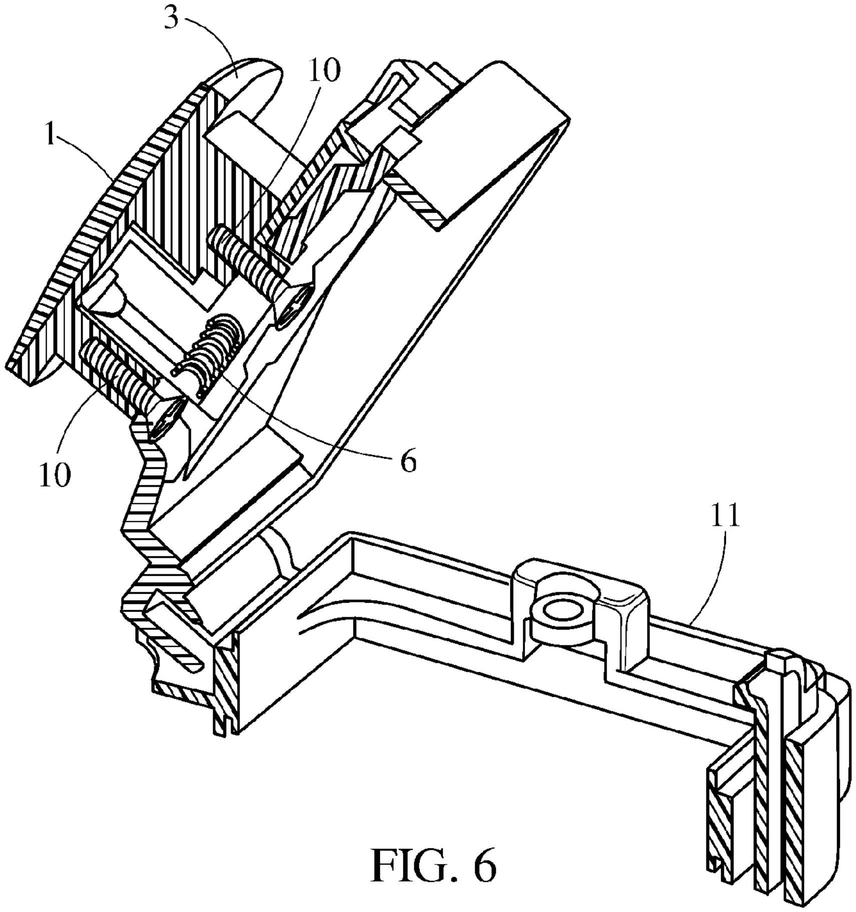
FIG. 6 is a perspective sectional view taken along lines 6-6 of FIG. 1; showing however, the stop cover as it would appear after it has been opened.

The exploded view of FIG. 4 additionally illustrates that lock piece 5 and a lock spring 4 are assembled and located in a slot g of lock cover 9. Plug-in unit 2 is located immediately above stop button 3 and an opening c in the button. Two slide block pieces 13 are also shown as well as return springs 12 for disposal in a groove h provided in stop cover 9. A push button 7 and its return spring 6 are located in stop button 3 and in the plane of the raised block e of lock piece 5. Stop button 3 is secured to lock cover 9 with tapping screws 10, as shown in FIG. 6. Lock cover 9 includes a hinge portion **9*a* which is biased to the open position shown in FIG. 6 by a torsional spring 8. In FIGS. 1-3 cover 9 is shown closed and locked to base 11**.

Figure 7:
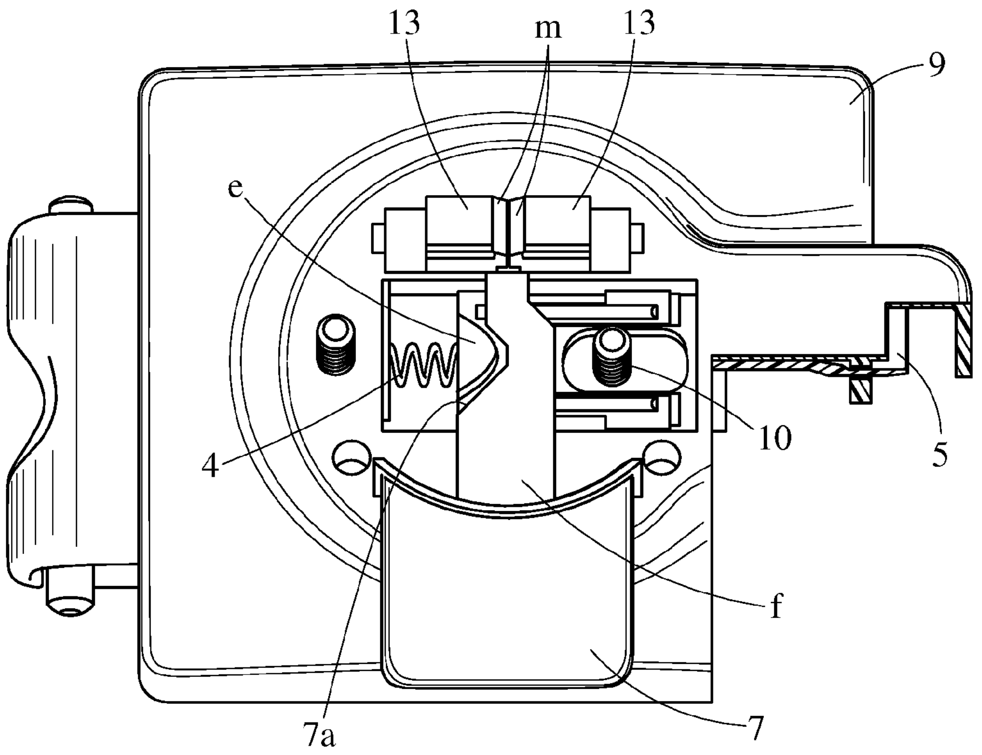
FIG. 7 is a perspective view of the invention with the retainer cover, stop button and plug-in unit removed and a portion of the stop cover and lock base broken away to show inner workings of the invention in its locked position; and, FIG. 8 is a perspective view of the invention similar to that of FIG. 7 showing however the inner workings of the invention as they appear when the unit is in its open unlocked position.
Figure 8:
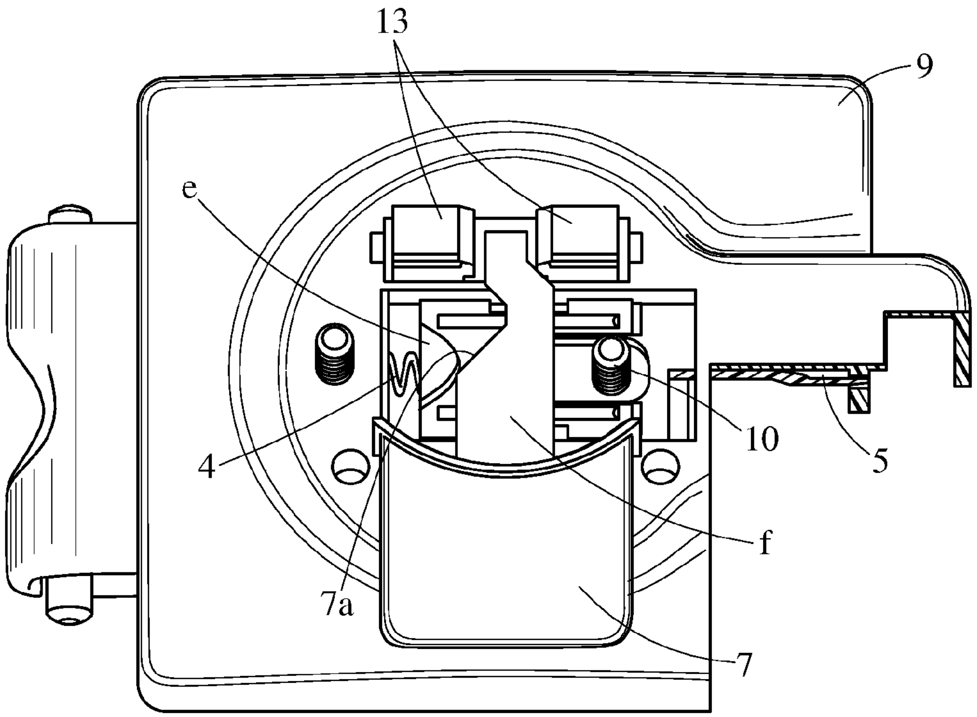

Returning to FIG. 4, it will be appreciated that key b of unit 2 is placed between slide blocks 13 by inserting it into hole c of stop button 3 which as can be visualized from FIG. 7 separates blocks 13 as shown in FIG. 8. As such, separated blocks 13 have a gap between them as also shown in FIG. 8. As the figures also show, push rod f of push button 7 has an inclined plane **7*a* and a configuration that allows it to mesh with a raised block e at the rear of lock piece 5. As such, push button 7 can be pushed inwardly by hand, which pushes rod f into the gap between the slide blocks 13. The inclined plane 7***a* of push rod f moves against the inclined plane of raised block e to move lock piece 5 backwards (to the left as shown in FIG. 8) which causes the forward end of the lock piece (the lock tongue) to separate from lockstitch k of lock base 11, thereby allowing the torsional spring 8 to open stop cover 9 as shown in FIG. 6.

Figure 5:
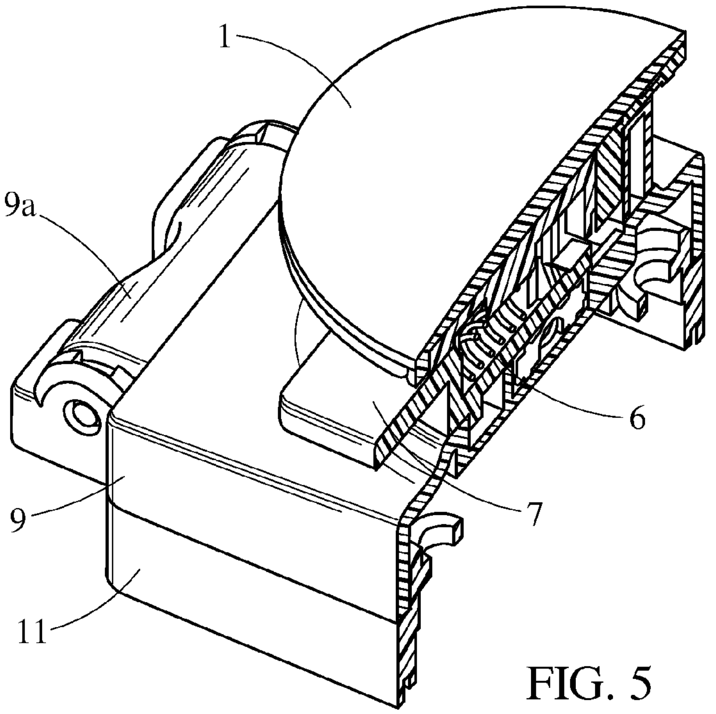
FIG. 5 is a perspective sectional view taken along lines 5-5 of FIG. 1.

When plug-in unit 2 is removed from the slide blocks 13, the blocks close under spring pressure 12 as shown in FIG. 7. The push rod f of push button 7 is removed from the blocks by action of return spring 6. (See FIGS. 4-6) As such, rod 7 is prevented from moving back between slide blocks 13. Therefore, the inclined plane 7*a* of push rod f cannot force movement of raised block e and the tongue of lock piece 5 cannot move backwards to separate from lockstitch k. Accordingly, the stop cover is now prevented from opening.

As best shown in FIG. 4, the end of key b of plug-in unit 2 is rounded or arcuate which allows the key to push open the slide blocks 13 so that push rod 7 can be conveniently inserted between the slide blocks. The slide blocks have upper inclined planes m, as shown in FIGS. 4, 7 & 8 which receive the rounded end of key b.

FIG. 4 also illustrates that base 11 has a lock hole j which allows the user to secure plug-in unit with a padlock (not shown) without removal of plug-in unit 2. In addition, it will be appreciated that the lockstitch k in base 11 is constructed in a manner that allows it to be enclosed by the lock cover and/or base to prevent direct backward pushing of the lock piece at the front end of lock base which if permitted would open the stop cover.

As further illustrated, retainer cover 1 is provided to cover hole c so that foreign matter is prevented from falling into the hole when key b is removed. A stub a on retainer cover 1 is also provided which cooperates with recessed slot d on the edge of stop button 3 to achieve the goal of locking retainer 1 in place.

The invention has been described in detail with reference to particular embodiments thereof, but it will be understood that various other modifications can be effected within the spirit and scope of this invention.

What is claimed is:

1. A push-in emergency stop cover comprising
a plug-in unit,
a retainer cover,
an emergency stop button,
a lock cover with an opening provided in said lock cover,
a lock base,
a lock piece,
a lockstitch provided in said lock base for receiving an end of said lock piece,
a combination of said lock piece and a lock spring assembled together in the lock cover,
a slide block having a first return spring,
a push button and a push rod having an inclined plane and each said push button and push rod having a second return spring,
said slide block and said first return spring being located in said opening in the lock cover,
said plug-in unit having a key,
a raised block provided with an inclined plane located at a rear of said lock piece such that when said key of the plug-in unit is inserted against said slide block, said slide block is moved to receive said push rod, and the inclined plane of said push rod is moved against the raised block at the rear of said lock piece to move said lock piece in a rearward direction.

2. The push-in emergency stop cover according to claim 1 wherein the slide block comprises two blocks and two return springs, said key of the plug-in unit passes through a hole provided in the stop button to a location of the two slide blocks to move them apart, and when the key is pulled out from said two slide blocks, the springs of said two blocks return the two slide blocks to a closed position and the push rod is held back so that said lock piece cannot separate from the lockstitch of the lock base, and said lock cover does not open even if the key is pulled out when lock cover is in an open position.

3. The push-in emergency stop cover according to claim 2 wherein the shape of an end of said key of said unit is an arc or rounded shape.

4. The push-in emergency stop cover according to claim 2 wherein said lockstitch is enclosed by the lock cover.

5. The push-in emergency stop cover according to claim 2 wherein said lockstitch is enclosed by the lock base.

6. The push-in emergency stop cover according to claim 2 wherein a stub is provided on the retainer cover, and a recessed opening is provided in said stop button for holding the retainer cover in place on the stop button.

7. The push-in emergency stop cover according to claim 2 wherein said lock base is provided with an opening for receiving a pad lock.

8. The push-in emergency stop cover according to claim 1 wherein the shape of an end of said key of said unit is an arc or rounded shape.

9. The push-in emergency stop cover according to claim 1 wherein said lockstitch is enclosed by the lock cover.

10. The push-in emergency stop cover according to claim 1 wherein said lockstitch is enclosed by the lock base.

11. The push-in emergency stop cover according to claim 1 wherein a stub is provided on said retainer cover, and a recessed opening is provided in said stop button for holding the retainer cover in place on the stop button.

12. The push-in emergency stop cover according to claim 1 wherein said lock base is provided with an opening for receiving a pad lock.

* * * * *